J. A. PILCHER.
TRUCK BOLSTER FOR RAILWAY CARS.
APPLICATION FILED OCT. 15, 1914.
1,147,748.  Patented July 27, 1915.
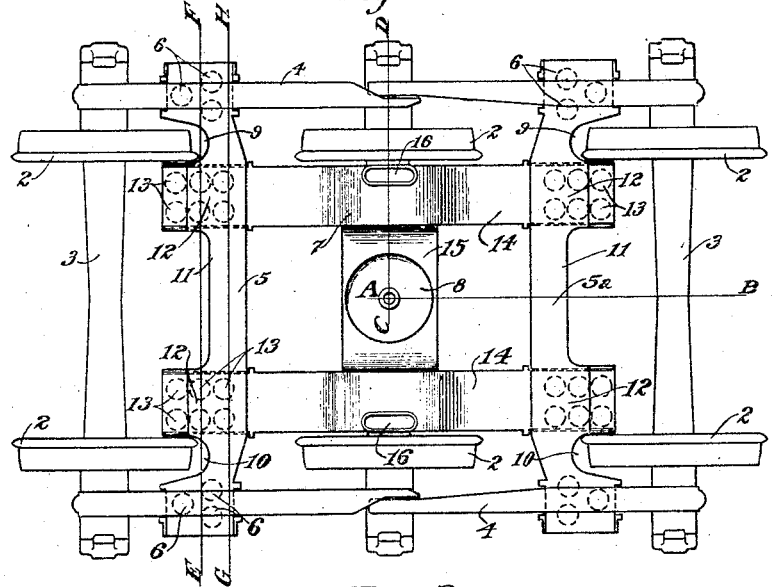
Witnesses
F. W. Hover
M. H. Martin
Inventor
John A. Pilcher
By B. W. Kadel
attorney

UNITED STATES PATENT OFFICE.

JOHN A. PILCHER, OF ROANOKE, VIRGINIA.

TRUCK-BOLSTER FOR RAILWAY-CARS.

1,147,748.  Specification of Letters Patent.  Patented July 27, 1915.

Application filed October 15, 1914. Serial No. 866,810.

*To all whom it may concern:*

Be it known that I, JOHN A. PILCHER, a citizen of the United States, residing at Roanoke, in the county of Roanoke and State of Virginia, have invented certain new and useful Improvements in Truck-Bolsters for Railway-Cars, of which the following is a specification.

This invention relates to bolsters for car trucks and the principal object of the same is to provide a transverse bolster member having recesses in the body thereof for clearing the wheels, brake parts, etc., of the car truck.

Other objects are to provide a composite truck bolster of simple design and economical sections to fulfil the peculiar demands of certain types of trucks.

With these general objects and others in view the invention consists in the formation and combination of parts as will be hereinafter described and claimed.

In the drawings, Figure 1 shows in plan view a truck having the bolster of my invention applied thereto and Fig. 2 a side elevation partly in section, of the same, the sectional portion being taken on the line AB, Fig. 1. Fig. 3 is an end elevation, partly in section of the same, the sectional portion being taken on the line CD, Fig. 1. Fig. 4 is a broken plan view of an alternate design of bolster shown separate from the other truck parts.

Referring to the drawings where the same parts are similarly designated wherever they occur, 1 represents the truck having wheels 2, axles 3, and side frames 4. The truck shown is of the six-wheel type and consequently has two transverse bolsters 5 and $5^a$, which extend from side frame to side frame between the wheels 2, and are supported on the side frames at the ends by means of the springs 6.

Extending from transverse bolster 5 to transverse bolster $5^a$ and spanning the middle axle of the truck is a longitudinal bolster 7, which carries the truck center plate 8.

In various types of six-wheel trucks it is necessary that one or more of the springs 6 in each group be located slightly in front of the end truck wheels, so that the transverse bolsters 5 and $5^a$ may not be made of a uniform section, symmetrical about the transverse center line EF, (see Fig. 1), as would naturally be desired, but must have portions of the metal cut away at 9 and 10 to form recesses for the wheels. It is also sometimes necessary or desirable to cut away a portion as at 11 to clear the brake levers or other parts. Consequently the main portions of the transverse bolsters 5 and $5^a$ usually follow a center line passing between the wheels, corresponding to the line GH, (see Fig. 1,) while the bolster arms or main spring seat portions usually extend outwardly at an angle or are passed around outside of the end wheels to reach the necessary location of the springs. It has heretofore been the practice in such cases to cast integral or to rigidly fasten together the transverse bolsters 5 and $5^a$ and the longitudinal bolster 7 in order to provide means for withstanding the torque set up in the transverse bolsters about the line EF, Fig. 1. An illustration of such a bolster may be seen by referring to my previous Patent #1,095,594.

In the present invention I am enabled to avoid this rigidity of bolster construction by providing seats 12 on the transverse bolsters 5 and $5^a$ for the ends of the longitudinal bolster 7, these seats extending out from the main portion of the transverse bolster members and being so disposed that the center of the load from the ends of the longitudinal bolster member will be transferred to the transverse bolsters at a point or points located on the line EF, Fig. 1. By so constructing the transverse bolster members and the longitudinal bolster member any cuts or recesses may be made in the transverse members to accommodate wheels, brake parts, etc., without inducing any turning or twisting effect in the transverse bolsters about the line EF, and if the sections are made sufficient to carry the load, the fact that the center lines thereof are offset from the center line EF of the loading points will have no effect on the equilibrium of the parts, under load. It will be understood that this construction does not eliminate all torque from the transverse bolsters, but only the torque about the line EF which normally tends to produce instability of the parts. In order to provide ample strength, therefore, for the main portions of the transverse bolsters that are disposed about the line GH or similar lines offset from EF, the section of the main portion is made of box shape so as the better to resist the twist and the bending and at the same time to form a section that will readily join with the open section of the transverse bolsters at the seats 12. By thus being enabled to make the transverse and longitudinal bolster members separate and without being rigidly fastened together, and at the same time reaching around the end wheels to the springs 6, I provide a bolster construction that is more readily manufactured, and I am further enabled to provide a somewhat more flexible bolster as a whole. In order to better attain this latter end I preferably insert springs 13 between the longitudinal and transverse bolsters, these springs serving also to increase the total spring deflection of the truck, inasmuch as they are disposed in series with the main springs 6.

In Figs. 1, 2, and 3 I have shown a desirable arrangement of the longitudinal, or center bolster, the same being made in the form of an H, the parallel members 14 thereof extending longitudinally of the truck and inside of the wheels and side frames, the transverse member 15 of the H being disposed transversely of the truck and having the center plate 8 either cast integral with, or secured to this transverse, or center portion. The parallel members 14 are humped where they cross over the middle axle and the transverse member 15 is made of inverted U-shape in cross section, the legs of the U extending downward along each side of the middle axle. The customary side bearings 16 are provided on the humps of the parallel members, and the value of the springs 13 will now be seen in that they form a cushion for the side bearing blow before it passes to the main transverse bolsters 5 and 5ª, and the side bearing blow will not be so apparent on the main springs 6.

In Fig. 4 I have shown an alternate design of longitudinal bolster 7 which is a simple beam extending from the transverse bolster member 5 to the transverse bolster member 5ª, the seats 12 on the transverse members being located at the centers. This longitudinal bolster is also humped up over the middle axle and is preferably made box shape in cross section. The functions of the various parts with reference to the torque in the transverse bolsters is the same in this arrangement as in that previously described.

It will be understood that various deviations within the scope of the claims might be made in the parts as I have shown and described them without departing from the spirit of my invention.

Having thus described my invention, what I claim is:

1. A transverse truck bolster having spring seats at the ends thereof, and having a load-supporting seat intermediate the said spring seats, said load supporting seat and said spring seats being in the same line transversely of the truck, a portion of the said transverse bolster being disposed about a line slightly removed longitudinally of the truck from the line of said seats, substantially as described.

2. A transverse truck bolster having extensions from the main portion thereof adapted to form spring seats and load supporting seats, all of said seats being in the same line transversely of the truck, and said line being removed, longitudinally of the truck, from the center line, transversely of the truck, of the main portion of said transverse bolster.

3. A transverse truck bolster having its main portion extending transversely of the truck and having spring seats adjacent the ends thereof, and outside of the truck wheels, said transverse bolster being further provided with a load-supporting seat intermediate the said spring seats, said spring seats and load supporting seats being out of line transversely of the truck with the main portion of said transverse bolster and all of said seats being located on a line transversely of the truck.

4. A transverse truck bolster having extensions from the main portion thereof adapted to form spring seats and load supporting seats, all of said seats being in the same line transversely of the truck, and said line being removed, longitudinally of the truck, from the center line, transversely of the truck, of the main portion of said transverse bolster, the said main portion of the transverse bolster being box-shaped in cross section.

5. A truck bolster having two transverse members and a longitudinal member, seats on said transverse members adapted to support the ends of said longitudinal member, said transverse members having spring seats adjacent the ends thereof and slightly removed, longitudinally of the truck, from the main portion of said transverse members, the said spring seats and the said seats for the longitudinal members being in the same line transversely of the truck.

6. A transverse truck bolster having an extension longitudinally of the truck from the main portion thereof adapted to form a load supporting seat, the said transverse bolster being provided with supporting means at points removed longitudinally of the truck from the main portion of said bolster and substantially in line, transversely of the truck, with said load supporting seat.

7. A truck bolster having two transverse members and a longitudinal member, seats on said transverse members removed longitudinally of the truck from the main portion of said transverse members and adapted to receive and support the ends of the said longitudinal member, and springs interposed between the said transverse members and the ends of the said longitudinal member, said longitudinal member being of H-shape in plan view, the parallel members of the H being disposed longitudinally of the truck and between the middle wheels.

8. A truck bolster having two transverse members and a longitudinal member, seats on said transverse members adapted to receive the ends of said longitudinal member, and springs interposed between the said transverse members and the ends of the said longitudinal member, said longitudinal member being of H-shape in plan view, the parallel members of the H being disposed longitudinally of the truck and within the middle wheels, and being humped up over the middle axle, and side bearings on the humped up portion of the parallel members of the H.

9. A transverse bolster for six-wheel trucks having its main portion extending transversely of the truck and between the end and middle truck wheels, and having the ends of said transverse bolster extending longitudinally of the truck alongside of the end wheels to form spring seats and having a load supporting seat between the said spring seats, all of said seats being in the same line transversely of the truck and said line being removed, longitudinally of the truck, from the center line transversely of the truck of the main portion of the said bolster.

10. A truck bolster having two transverse members and a longitudinal member, seats on said transverse members removed longitudinally of the truck from the main portion of said transverse members and adapted to receive and support the ends of the said longitudinal member.

In testimony whereof I affix my signature in presence of two witnesses.

JOHN A. PILCHER.

Witnesses:
H. B. WADE,
W. B. KERR.